(12) United States Patent
Viaud

(10) Patent No.: US 8,789,687 B2
(45) Date of Patent: Jul. 29, 2014

(54) BELT TRACKING CONTROL

(75) Inventor: Jean Viaud, Reyssouze (FR)

(73) Assignee: Deere & Company, Moline, IL (US)

( * ) Notice: Subject to any disclaimer, the term of this patent is extended or adjusted under 35 U.S.C. 154(b) by 177 days.

(21) Appl. No.: 13/167,469

(22) Filed: Jun. 23, 2011

(65) Prior Publication Data

US 2012/0152698 A1 Jun. 21, 2012

(30) Foreign Application Priority Data

Jun. 24, 2010 (DE) .......................... 10 2010 030 482

(51) Int. Cl.
*B65G 39/16* (2006.01)
*A01F 15/18* (2006.01)
*A01F 15/07* (2006.01)

(52) U.S. Cl.
CPC ........... *A01F 15/18* (2013.01); *A01F 2015/078* (2013.01); *A01F 2015/186* (2013.01)
USPC ......... 198/806; 198/690.2; 198/837; 198/807

(58) Field of Classification Search
None
See application file for complete search history.

(56) References Cited

U.S. PATENT DOCUMENTS

| 2,869,712 | A | * | 1/1959 | Kindig | 198/808 |
| 3,407,673 | A | * | 10/1968 | Slezak | 474/104 |
| 3,702,131 | A | * | 11/1972 | Stokes | 198/806 |
| 3,981,391 | A | | 9/1976 | Phillips et al. | |
| 4,038,809 | A | | 8/1977 | Arnould et al. | |
| 5,941,168 | A | * | 8/1999 | Kluver et al. | 100/87 |

FOREIGN PATENT DOCUMENTS

DE   2556688 A1   7/1976

OTHER PUBLICATIONS

Search Report for related European Patent Application No. 11167689.6, dated Aug. 22, 2013.

* cited by examiner

*Primary Examiner* — Kavel Singh
(74) *Attorney, Agent, or Firm* — Quarles & Brady LLP

(57) ABSTRACT

A belt tracking control device for a conveyor device is provided, in particular for agricultural round balers, having at least one roller and at least one traction element which is guided over the roller and having at least one edge region which extends from the side edge of the traction element in the direction of the width thereof. At least one guide roller is provided through which the edge region can be deflected from the movement plane of the traction element.

20 Claims, 3 Drawing Sheets

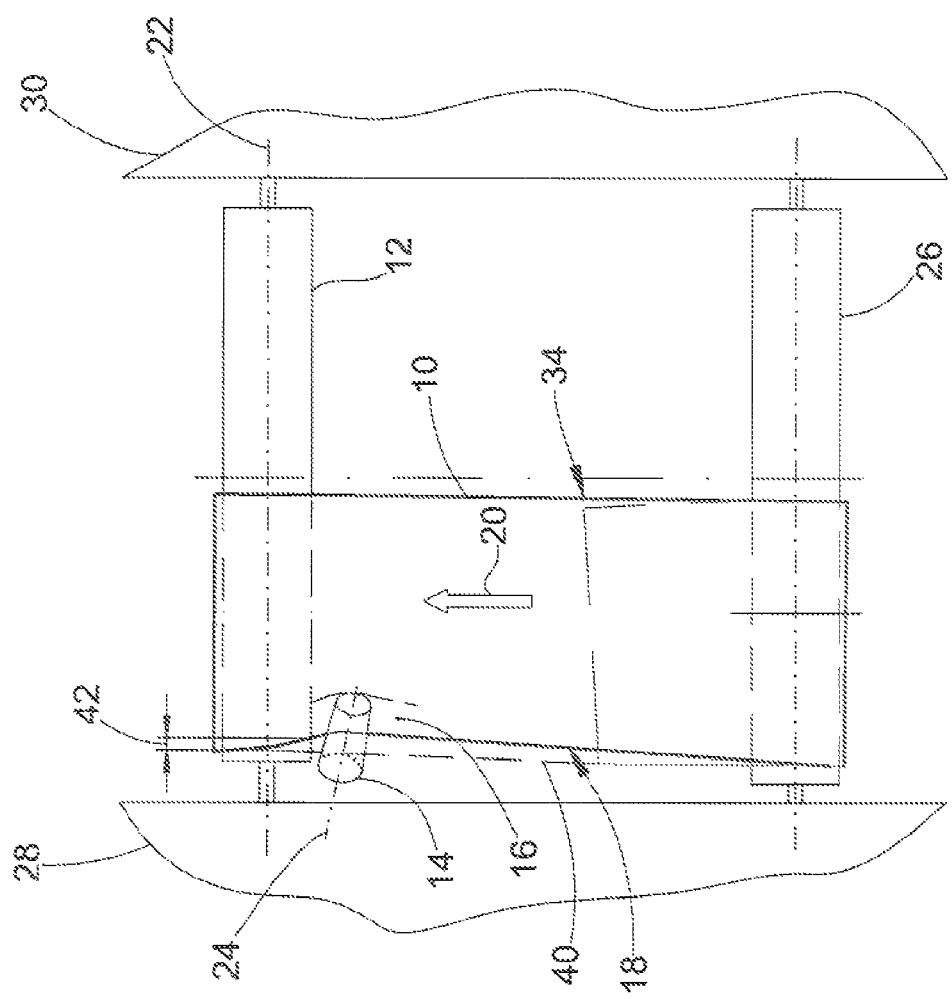
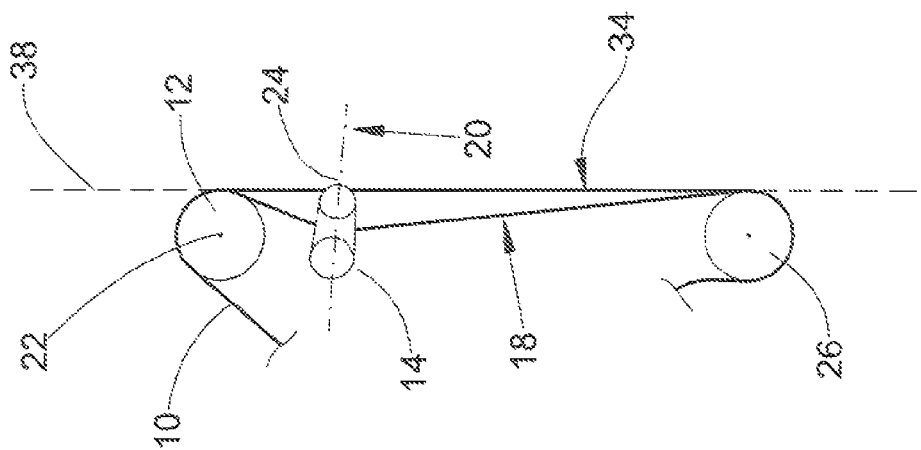

BELT TRACKING CONTROL

FIELD OF THE INVENTION

The invention relates to a belt tracking control device, in particular for round balers, having at least one roller and at least one traction element which is guided over the roller and having at least a first edge region which extends in a transverse direction with respect to the longitudinal direction of the traction element.

BACKGROUND OF THE INVENTION

Conveyor devices with traction elements are used, in particular, for transporting loose conveyed material, such as bulk piece goods. For this purpose, the conveyor devices have traction elements, in particular flat belts, warp knit fabrics or the like which carry the conveyed material or acts on it or picks it up. The traction element is guided or deflected by way of rollers.

Such conveyor devices are used, for example, in agricultural round balers which pick up straw or hay as the conveyed material, in order to wind the material into the shape of a round bale.

In particular in round balers, it is necessary to feed the conveyed material uniformly, since the external shape of the round bale is dependent upon the uniformity of feeding of the material to be pressed.

When the conveyed material is fed in a non-uniform way, the traction element is loaded on one side. In addition to the movement component in the running direction of the traction element, one-sided loading also results in a movement component which runs transversely with respect to the direction of movement and by which the traction element is moved on the roller in the direction of the rotational axis thereof. This oblique running of the traction element can lead to tearing of the traction element or to crossing over of adjoining traction elements which run parallel to one another.

In order to avoid oblique running of the traction elements it is known from the prior art to arrange, at the side edges of the traction elements, guide strips which extend in a direction parallel to the running direction of the traction elements and prevent a movement of the traction elements which are directed transversely with respect to the latter.

Owing to the friction between the side edge of the traction elements and the guide strip, the traction elements are subject to more rapid wear than would be the case without the guide strips. Furthermore, guide strips also generally constitute collecting points for circulating conveyed material, and this can lead to blockages.

SUMMARY OF THE INVENTION

The object of the present invention is therefore to provide a belt tracking control device which loads the traction elements mechanically only to a small extent and prevents blockage of conveyed material.

The belt tracking control device comprises at least one roller and at least one traction element which is guided over the roller. In this context it is known, in particular because of round balers, that the traction element is guided over the roller from a first movement plane into a second movement plane.

According to the invention, the traction element has a first edge region which extends from the first side edge of the traction element in a longitudinal transverse direction with respect to the latter. The longitudinal direction of the traction element corresponds here essentially to the running direction provided for the traction element.

According to the invention, at least one guide roller is provided by which the first edge region can be deflected out of the respective movement plane of the traction element. The guide roller acts on the surface of the traction element in the edge region thereof.

The deflection of the edge region causes the side edge of the traction element to be offset in the axial direction of the roller as the edge region runs onto the roller. As a result of this offset of the side edge, the traction element is pushed in the axial direction of the roller as it runs onto the roller, as a result of which the course of the traction element is corrected by means of the roller and oblique running of the traction element is prevented.

Furthermore, the deflection by the guide roller causes the tensioning in the edge region of the traction element to be increased. In an effort to reduce the tensioning, the traction element therefore moves in the axial direction of the roller in order to reduce the magnitude of the deflection of the edge region.

In addition to essentially cylindrical casing shapes, the roller can also have other shapes such as, for example, a convex shape. Since belt-like traction elements tend to run over the highest point of a roller, a convex section on the roller causes the traction element to be centered on the roller.

The traction element may be, for example, a flat belt or ribbon belt on a rubber basis with one or more layers of plastic fibers and preferably having a patterned surface.

According to the invention, the guide roller can be mounted in a cantilevered fashion, as a result of which circulating conveyed material is prevented from collecting and a self-cleaning effect is brought about.

According to a further embodiment of the invention, the guide roller is arranged upstream, i.e. in front of the roller in the movement direction of the traction element. As a result of this arrangement, a small deflection of the edge region is already sufficient to correct the course of the traction element over the roller.

According to the invention it is possible to provide that the guide roller can be moved relative to the roller. As a result, the magnitude of the deflection of the edge region of the traction element can be varied. The magnitude of the deflection of the edge region determines the offset of the side edge as it runs onto the roller in the axial direction thereof.

The adjustment of the guide roller relative to the roller can be carried out manually from an active position into an inactive position, wherein in the inactive position the edge region of the traction element is not deflected out of the movement plane of the traction element. Furthermore, the adjustment of the guide roller can also be carried out as a function of the course of the traction element on the roller, as a result of which, when a control device is used, there is the possibility of automatically correcting the course of the traction element during the operation of the conveyor device.

According to the invention, the casing shape of the guide roller can be essentially cylindrical or conical. A conical casing shape, the diameter of which becomes smaller from the side edge over the width of the traction element, causes the magnitude of the deflection of the traction element to decrease continuously from the side edge in the direction of the width thereof.

According to the invention, the rotational axis of the guide roller can extend at an angle in a range from 20° to 45° relative to the movement plane of the traction element. As a result, the edge region is deflected to the greatest extent at the side edge, and the magnitude of the deflection of the traction element therefore decreases continuously in the direction of the width thereof toward the center.

According to a further embodiment of the invention, the axis of the guide roller extends in a plane parallel to the movement plane of the traction element at an angle in a range from 5° to 15° with respect to the axis of the roller.

Since multi-dimensional deflections with small radii always constitute increased material loading, the service life of the traction element is increased as a result of a continuous decrease in the magnitude of the defection of the traction element in the direction of the width thereof.

Both the conical casing shape of the guide roller and the pivoting of the rotational axis of the guide roller with respect to the rotational axis of the roller cause the side edge to have a larger offset in the axial direction of the roller than the remaining edge region.

Instead of the pivoting with respect to the rotational axis of the roller, the axis of the guide roller can, according to a further embodiment of the invention, extend in a direction parallel to the axis of the roller.

According to one embodiment of the invention, the guide roller extends over at least a third of the width of the traction element. The guide roller can extend up to the center of the traction element here.

According to the invention, the guide roller and the roller can be arranged on opposite sides of the traction element, as a result of which the guide roller and the roller are each assigned to opposite surfaces of the traction element. The edge region of the traction element runs onto the roller here before the rest of the section of the traction element comes into contact with the roller.

Alternatively, it is also possible to provide for this purpose that the guide roller and the roller are arranged on the same side with respect to the traction element. As a result, when the traction element runs onto the roller the edge region is lifted therefrom.

According to a further embodiment of the invention, it is possible to provide that the traction element has a second edge region which extends from the second side edge of the traction element transversely with respect to the longitudinal direction thereof, i.e. in the direction of the first side edge, and is deflected by a second guide roller.

The deflection of the second edge region by the second guide roller causes the second side edge of the traction element to be offset in the axial direction of the roller as the second edge region runs onto the roller. As a result of this offset of the second side edge, the traction element is displaced in the axial direction of the roller as it runs onto the roller, as a result of which the course of the traction element over the roller is corrected and oblique running of the tension element is prevented.

The deflection of the first and second edge regions on the traction element causes the course of the traction element to be corrected in both directions axially with respect to the roller.

Where at least two traction elements which are guided largely parallel one next to the other are used, the second guide roller can be provided between the traction element, wherein the second guide roller deflects the edge regions, guided one next to the other, of the two traction element. According to the invention, the second guide roller can, for example, be in the shape of a double cone, with the edge regions of each traction element which run one next to the other each being assigned a conical section.

BRIEF DESCRIPTION OF THE DRAWINGS

Exemplary embodiments of the invention are described in detail below with reference to the accompanying drawings, wherein:

FIG. 2 is a lateral view of the traction element, the roller and of the guide roller from FIG. 1 with a second roller;

FIG. 3 is a plan view of the device from FIG. 2; and,

DESCRIPTION OF THE PREFERRED EMBODIMENT

Figure 1:
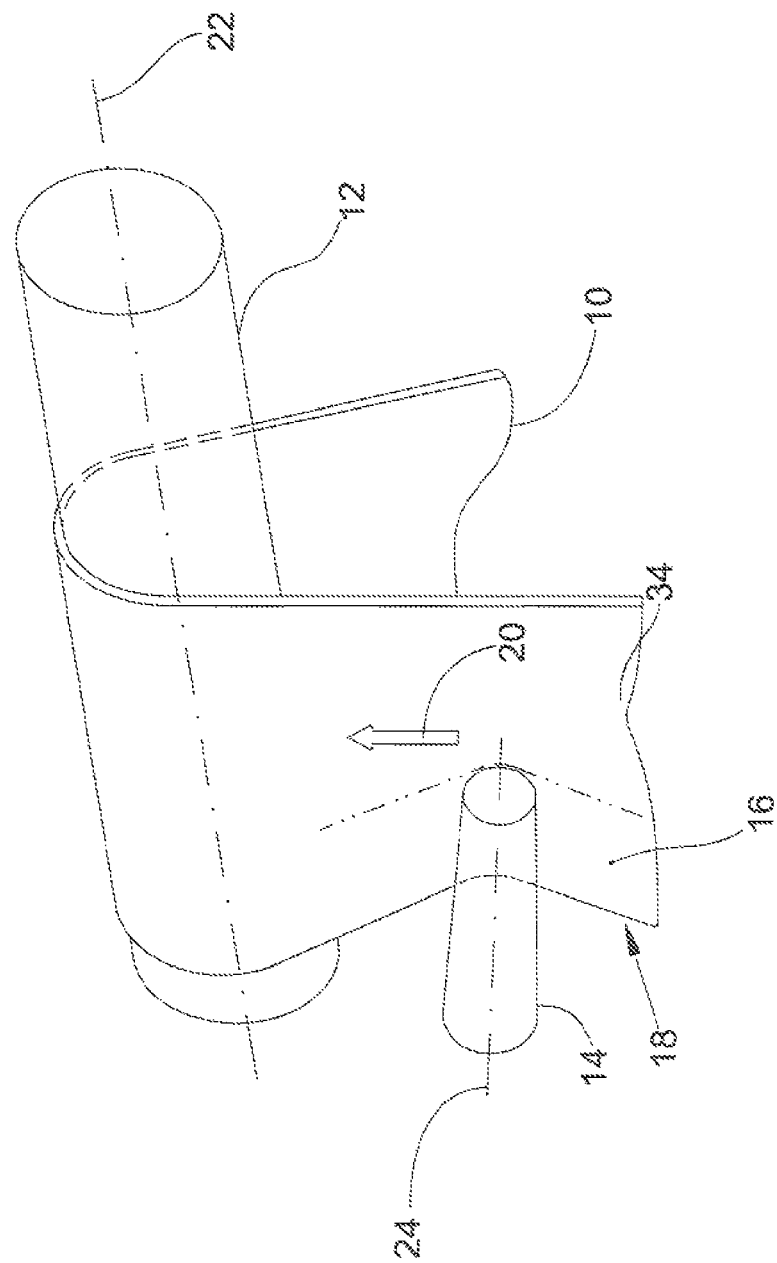
FIG. 1 is a perspective schematic illustration of a traction element which is guided over a roller and is deflected by a guide roller.

FIGS. 1, 2 and 3 show a traction element 10 with an edge region 16 which extends from the side edge 18 in the width direction, a first roller 12, a second roller 26 and a guide roller 14. For purposes of better illustration, the second roller 26 is not shown in FIG. 1.

The traction element 10 is deflected over the second roller 26 and the first roller 12 in the direction of the arrow 20. The rollers 12, 26 determine the movement plane of the traction element 10, wherein the traction element 10 is pre-stressed by the rollers 12, 26. In the illustration according to FIG. 2, the movement plane of the traction element 10 corresponds to the tangential plane which is formed by the rollers 12, 26 and which is indicated in FIG. 2 by the dashed line 38.

In the movement direction of the traction element 10 in front of the first roller 12, a guide roller 14 is arranged, the guide roller 14 acting on the surface of the traction element 10 in the edge region 16 thereof and deflecting the edge region 16 out of the movement plane 38 of the traction element 10 before the traction element runs onto the first roller 12. The traction element 10 runs through here between the guide roller 14 and the first roller 12.

The guide roller 14 has a conical casing shape, wherein the diameter decreases in the width direction of the traction element 10. The axis 24 of the guide roller 14 extends at an angle relative to the axis 22 of the first roller 12, with the result that the magnitude of the defection of the edge region 16 decreases continuously starting from the side edge 18 thereof. The width of the deflected edge region 16 is determined by the width of the contact face of the guide roller 14 with the traction element 10.

As is apparent from FIG. 2, the edge region 16 is deflected out from the movement plane of the traction element 10, with the result that the traction element 10 runs onto the first roller 12 starting from the first side edge 18.

Furthermore, FIGS. 1 and 3 show that a lateral offset of the side edge 18 in the direction of the axis 22 of the first roller 12 additionally results from the deflection of the edge region 16 via the guide roller 14. FIG. 3 shows in this connection oblique running of the traction element 10 which is corrected by the deflection of the edge region 16.

In order to illustrate better the magnitude of the lateral offset 42 of the side edge 18, FIG. 3 shows a dashed line 40 which indicates the course of the side edge 18, as it would be if not for the deflection of the edge region 16 by the guide roller 14.

As can also be discerned from the illustration in FIG. 3, the first roller 12 and the second roller 26 are mounted so as to be rotatable between two side elements 28, 30. The guide roller 14 is, on the other hand, mounted in a cantilevered fashion on just one of the side elements 28.

The side elements 28, 30 can, for example, be components of a frame of a round baler (not illustrated).

Figure 4:
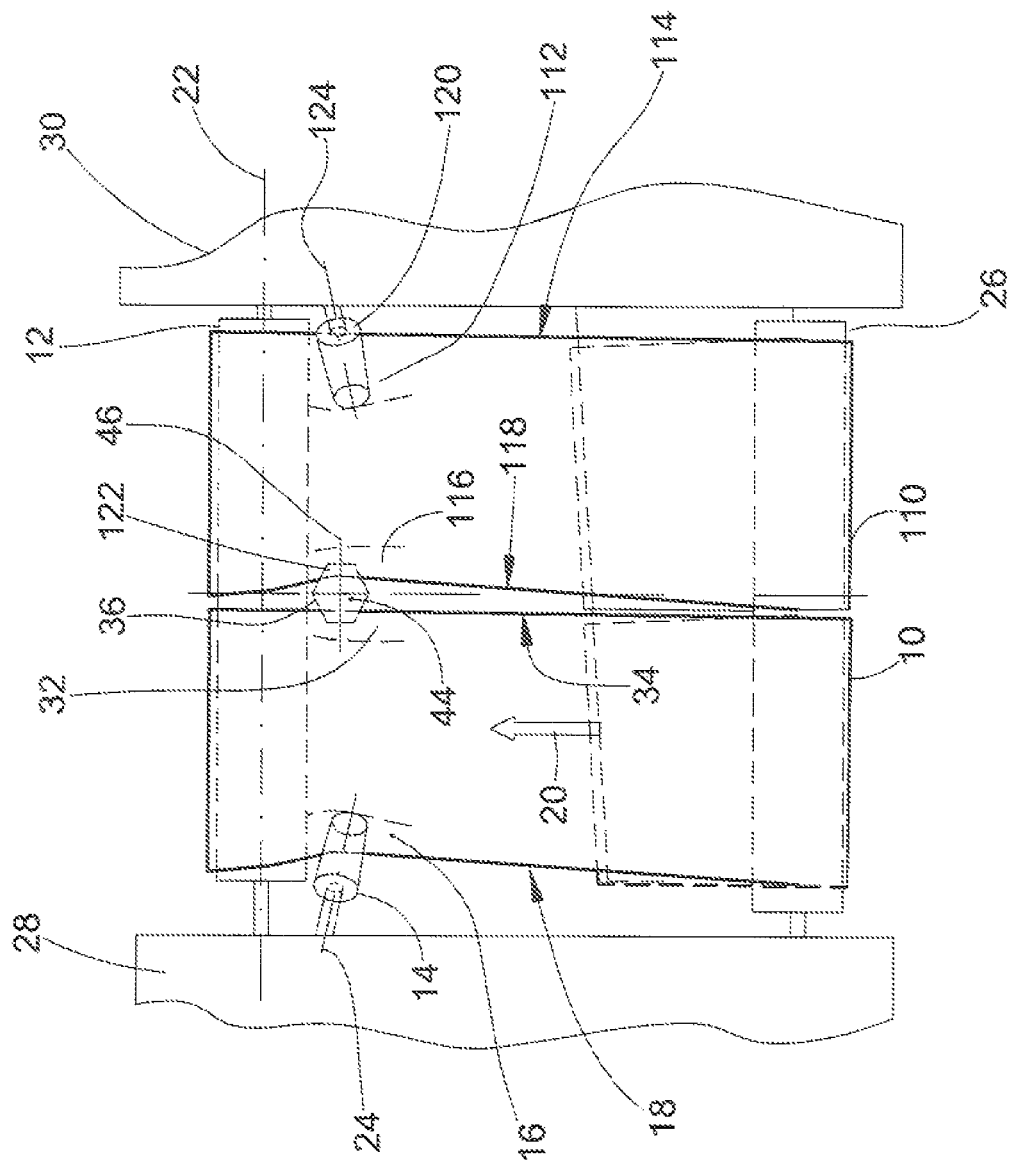
FIG. 4 is a plan view of two traction elements which are guided largely in parallel over two rollers the edge regions of which are deflected by respective assigned first and second guide rollers.

FIG. 4 shows a further embodiment of the device which is illustrated in FIG. 3 and in which, in addition to the traction element 10, a second traction element 110, a second guide roller 36 and a third guide roller 120 are also provided.

The traction element 10 has, in addition to the edge region 16, a second edge region 32 on the opposite side, which second edge region 32 extends from the second side edge 34 of the traction element 10 in the direction of the width thereof or in the direction of the side edge 18.

The second traction element 110 and the third guide roller 120 are arranged in mirror-symmetrical fashion with respect to the traction element 10 and the guide roller 14 in FIG. 4, wherein the second traction element 110 also has two edge regions 112, 116 which extend from the side edges of the traction element 110. The edge region 112 of the second traction element 110 is assigned here to the third guide roller 120, wherein the latter is deflected by the third guide roller 120, like the edge region 16 of the traction element 10. In order to avoid repetitions, reference is therefore made to the description of FIGS. 1 to 3. The function of the guide roller 14 which extends along the axis 24 and deflects the edge region 16 of the traction element 10 corresponds here to the function of the third guide roller 120 which extends along the axis 124 and which deflects the edge region 112 of the second traction element 110.

The second guide roller 36, which is in the shape of a double cone, is arranged between the two traction elements 10, 110.

Each of the traction elements 10, 110 is assigned here a conical section 44, 122, wherein the conical section 44 deflects the second edge region 32 of the traction element 10, and the second conical region 122 deflects the second edge region 116 of the second traction element 110. The axis 46 of the second guide roller 36 extends here essentially parallel to the axis 22 of the first roller 12.

The adjacent second edge regions 32, 116 of the traction element 10, 110 which run one next to the other are deflected by the second guide roller 36 in the same way as the edge region 16 of the traction element 10. Reference is made in this respect to the description of FIGS. 1 to 3.

Having described the preferred embodiment, it will become apparent that various modifications can be made without departing from the scope of the invention as defined in the accompanying claims.

The invention claimed is:

1. A belt tracking control device for a conveyor device, the conveyor device having a first roller and a second roller and a first traction element and a second traction element, wherein the first traction element is guided over the first roller and wherein the first traction element has a first edge region which extends from a side edge of the first traction element in the direction of the width thereof, wherein the second traction element is guided over the second roller and has a second edge region which extends from a side edge of the second traction element in the direction of the width thereof, wherein:
   an inner double guide roller is provided and positioned in contact with the first and second traction elements to deflect the first edge region from first movement plane in which is disposed an adjacent region of the first traction element and to deflect the second edge region from a second movement plane in which is disposed an adjacent region of the second traction element.

2. A belt tracking control device for a conveyor device as set forth in claim 1, further including:
   an outer guide roller provided and positioned in contact with the first traction element to deflect a first outer edge region from the first movement plane;
   wherein the first guide roller is arranged in front of the first roller in a movement direction of the first traction element.

3. A belt tracking control device for a conveyor device as set forth in claim 1, wherein:
   the outer guide roller is movable relative to the first roller.

4. A belt tracking control device for a conveyor device as set forth in claim 1, wherein:
   the outer guide roller has a cylindrical casing shape.

5. A belt tracking control device for a conveyor device as set forth in claim 1, wherein:
   the outer guide roller has a conical casing shape.

6. A belt tracking control device for a conveyor device as set forth in claim 1, wherein:
   an axis of the outer guide roller extends at an angle in a range from 20° to 45° relative to the first movement plane of the first traction element.

7. A belt tracking control device for a conveyor device as set forth in claim 1, wherein:
   an axis of the outer guide roller extends at an angle in a range from 5° to 15° relative to the axis of the first roller in a plane parallel to the first movement plane of the at least one traction element.

8. A belt tracking control device for a conveyor device as set forth in claim 1, wherein:
   an axis of the outer guide roller extends in a direction parallel to the axis of the first roller.

9. A belt tracking control device for a conveyor device as set forth in claim 1, further includes a side element;
   wherein the outer guide roller is cantilevered to the side element and extends over at least a third of the width of the first traction element.

10. A belt tracking control device for a conveyor device as set forth in claim 1, wherein:
   the outer guide roller and the first roller are arranged on a same side with respect to the first traction element.

11. A belt tracking control device for a conveyor device as set forth in claim 1, wherein:
   the outer guide roller and the first roller are arranged on opposite sides of the first traction element.

12. A belt tracking control device for a conveyor device as set forth in claim 1, wherein:
   a second guide roller is provided by which the second outer edge region is deflected from the second movement plane of the second traction element.

13. A belt tracking control device for a conveyor device including a first pair of rollers, a second pair of rollers, a first side element, a second side element, a first traction element, and a second traction element, the first traction element having a width, a first side region, and a second side region, the second traction element having a width, a third side region, and a fourth side region, the first traction element guided over the first pair of rollers along a movement plane that extends between the first pair of rollers, the second traction element guided over the second pair of rollers along a second movement plane that extends between the second pair of rollers, the device comprising:
   a first guide roller cantilevered to the first side element and extending to a free end in a transverse direction across the first traction element less then the width of the first traction element and contacting the first traction element at only the first side region;

a second guide roller cantilevered to the second side element and extending to a free end in a transverse direction across the second traction element less then the width of the traction element and contacting the second traction element at only a fourth side region; and a double guide roller contacting the first traction element at only the second side region and contacting the second traction element at only the third side region.

14. A belt tracking control device for a conveyor device as set forth in claim 13, wherein:

the first guide roller deflects the first side region of the first traction element from the first movement plane, and wherein at least a portion of a remaining width of the first traction element extends along the first movement plane;

wherein the second guide roller deflects the fourth side region of the second traction element from the second movement plane, and wherein at least a portion of the remaining width of the second traction element extends along the second movement plane; and wherein the double guide roller deflects the second and third side regions of the respective first and second traction elements from the first and second movement planes, and wherein the at least a portion of the remaining widths of the first and second traction elements extend respectively along the first and second movement planes.

15. A belt tracking control device for a conveyor device including:

a first traction element guided over a first roller, the first traction element extending between a first edge and a second edge, a first edge region extending from the first edge toward the second edge, a second edge region extending from the second edge toward the first edge, the first traction element moving in a first movement direction;

a second traction element guided over a second roller, the second traction element extending between a third edge and a fourth edge, a third edge region extending from the third edge toward the fourth edge, a fourth edge region extending from the fourth edge toward the third edge, the second traction element moving in a second movement direction; and a double guide roller positioned in contact with the second edge region of the first traction element and the third edge region of the second traction element;

wherein the double guide roller deflects the first edge region in a direction at least partially perpendicular to the first movement direction; and wherein the double guide roller deflects the third edge region in a direction at least partially perpendicular to the second movement direction.

16. A belt tracking control device for a conveyor device as set forth in claim 15, wherein the double guide roller has a casing including a first conical section and a second conical section, at least a portion of the first conical section is in contact with the second edge region, and at least a portion of the second conical section is in contact with the third edge region.

17. A belt tracking control device for a conveyor device as set forth in claim 16, wherein the first conical section and the second conical section are coaxial.

18. A belt tracking control device for a conveyor device as set forth in claim 15, wherein the first roller rotates about a first axis and the double guide roller rotates about a second axis essentially parallel to the first axis.

19. A belt tracking control device for a conveyor device as set forth in claim 15, further including a first guide roller and a second guide roller, wherein the first guide roller contacts the first edge region along a portion of the first edge region inward of the first edge, and wherein the second guide roller contacts the fourth edge region along a portion of the fourth edge region inward of the fourth edge.

20. A belt tracking control device for a conveyor device as set forth in claim 19, wherein at least one of the first guide roller and the second guide roller has a conical casing shape.

* * * * *